(12) United States Patent
Chen et al.

(10) Patent No.: US 11,953,063 B2
(45) Date of Patent: Apr. 9, 2024

(54) NORMALLY CLOSED DISC CLAMP SYSTEM AND ROTARY TABLE USING THE SAME

(71) Applicant: HIWIN TECHNOLOGIES CORP., Taichung (TW)

(72) Inventors: Peng-Wen Chen, Taichung (TW); Chien-Yu Lin, Taichung (TW); Li-Wen Huang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 346 days.

(21) Appl. No.: 17/462,583

(22) Filed: Aug. 31, 2021

(65) Prior Publication Data

US 2023/0068977 A1 Mar. 2, 2023

(51) Int. Cl.
*F16D 55/32* (2006.01)
*F16D 55/30* (2006.01)
(Continued)

(52) U.S. Cl.
CPC ............. *F16D 55/32* (2013.01); *F16D 55/30* (2013.01); *F16D 65/12* (2013.01);
(Continued)

(58) Field of Classification Search
CPC .......... F16D 65/12; F16D 55/32; F16D 55/36; F16D 2123/00; F16D 2125/06;
(Continued)

(56) References Cited

U.S. PATENT DOCUMENTS 3,927,737 A * 12/1975 Prillinger .............. F16D 65/853
188/170
4,184,573 A * 1/1980 Bricker ................... F16D 55/40
188/170
(Continued)

FOREIGN PATENT DOCUMENTS

CN 206031672 U 3/2017
CN 107131234 A 9/2017
(Continued)

OTHER PUBLICATIONS

CN 207942253 U (Year: 2018).*
(Continued)

*Primary Examiner* — Robert A. Siconolfi
*Assistant Examiner* — Mahbubur Rashid
(74) *Attorney, Agent, or Firm* — MUNCY, GEISSLER, OLDS & LOWE, P.C.

(57) ABSTRACT

A normally closed disc clamp system includes a housing with a rotating disc, a brake ring and a pressure-enhancing ring arranged therein. When only a first chamber is supplied with fluid, the fluid pushes the brake ring to release the rotating disc. When only a second chamber is fed with fluid, the fluid pushes the brake ring to keep the rotating disc in the braking state, and pushes the pressure-enhancing ring to compress an elastic unit. The energy generated by the compression of the elastic unit acts on the brake ring through the fluid, so that the brake ring achieves a double pressurization effect. If the action of the fluid fails, the brake ring can still provide a braking effect to the rotating disc through the elastic unit to improve operational safety. Further, the present invention further provides a rotating table using the normally closed disc clamp system.

10 Claims, 12 Drawing Sheets

(51) Int. Cl.
*F16D 65/12* (2006.01)
*F16D 121/04* (2012.01)
*F16D 123/00* (2012.01)
*F16D 125/08* (2012.01)

(52) U.S. Cl.
CPC ...... *F16D 2121/04* (2013.01); *F16D 2123/00* (2013.01); *F16D 2125/08* (2013.01)

(58) Field of Classification Search
CPC ...... F16D 55/24; F16D 65/00; F16D 2121/04; F16D 2125/08; F16D 55/30; B60T 1/065
See application file for complete search history.

(56) References Cited

U.S. PATENT DOCUMENTS

| | | | | |
|---|---|---|---|---|
| 4,279,330 | A * | 7/1981 | Pottorff | F16D 59/02 188/170 |
| 4,491,202 | A * | 1/1985 | Schmitt | F16D 55/40 188/71.6 |
| 4,667,527 | A * | 5/1987 | Ehrlinger | F16D 55/36 188/170 |
| 4,947,966 | A * | 8/1990 | Huff | B60T 1/062 188/170 |
| 6,041,896 | A * | 3/2000 | Bohm | F16D 55/40 188/71.5 |
| 7,743,893 | B2 * | 6/2010 | Daigre | F16D 65/186 188/170 |
| 7,909,147 | B1 * | 3/2011 | Schnell | F16D 65/853 188/264 D |
| 8,505,895 | B2 * | 8/2013 | Tatsuda | B23Q 16/102 269/57 |
| 9,169,884 | B2 * | 10/2015 | Hoots | F16D 65/12 |
| 9,878,412 | B2 * | 1/2018 | Nishimura | B23Q 7/02 |
| 10,082,185 | B1 * | 9/2018 | Shih | F16D 55/22 |
| 10,427,265 | B2 * | 10/2019 | Tachiki | B23Q 16/105 |
| 10,525,562 | B2 * | 1/2020 | Tachiki | B23Q 16/105 |
| 10,781,816 | B2 * | 9/2020 | Patil | F16D 55/42 |
| 2010/0319487 | A1 * | 12/2010 | Tatsuda | B23Q 16/105 74/813 L |
| 2015/0239087 | A1 * | 8/2015 | Itou | B23Q 11/0042 269/20 |
| 2015/0360337 | A1 * | 12/2015 | Nishimura | B23Q 11/0092 269/57 |
| 2018/0361524 | A1 * | 12/2018 | Tachiki | B23Q 16/105 |

FOREIGN PATENT DOCUMENTS

| | | |
|---|---|---|
| CN | 210024594 U | 2/2020 |
| DE | 19857962 A1 | 6/2000 |
| DE | 10035196 A1 | 3/2001 |
| DE | 102007053325 A1 | 5/2009 |
| EP | 2314415 A1 | 4/2011 |

OTHER PUBLICATIONS

CN 207358577 U (Year: 2018).*
CN 107939864 A (Year: 2018).*
CN 210461475 U (Year: 2020).*

* cited by examiner

NORMALLY CLOSED DISC CLAMP SYSTEM AND ROTARY TABLE USING THE SAME

BACKGROUND OF THE INVENTION

1. Field of the Invention

The present invention relates to braking device technology, and in particular relates to a normally closed disc clamp system and a rotary table using the normally closed disc clamp system.

2. Description of the Related Art

In order to prevent the spindle from rotating after processing, a brake set is usually configured to apply braking force to the stationary spindle to keep the spindle stable at a standstill. However, traditional brakes cannot provide braking force to the spindle under special conditions (such as unwarned power failure or pipeline rupture), which not only easily causes damage to the machine, but may even endanger the safety of surrounding personnel.

The normally closed hydraulic brake device disclosed by CN 210024594 U uses the elastic force of multiple springs to push the piston down under conditions such as shutdown or standby, so that the brake device is in a tight state and the spindle is locked, thereby preventing the spindle from rotating. When the brake is released, the hydraulic oil is used to push the piston in the reverse direction, so that the brake device becomes a released state, and the spindle can operate normally at this time. However, in the aforementioned patent documents, the braking force provided by multiple springs alone is very limited, and it is difficult to apply to heavy cutting and high feed occasions.

In addition, the conventional normally closed brake shown in FIGS. 1 and 2 mainly includes a brake disc 1, a brake piston 2, multiple compression springs 3, and a brake releasing piston 4. The compression springs 3 constantly exert an axial thrust on the brake disc 1, so that the brake disc 1 maintains a normally closed braking state. When only the brake piston 2 is subjected to fluid action, an axial thrust is applied to the brake disc 1, as shown in FIG. 1, so that the brake disc 1 provides a braking effect on the rotating shaft 5 under the combined action of the brake piston 2 and the compression springs 3. When only the brake releasing piston 4 is subjected to fluid action, it will exert a reverse thrust on the brake disc 1, and overcome the axial thrust exerted by the compression springs 3 on the brake disc 1, as shown in FIG. 2, making the brake disc 1 release the braking effect on the rotating shaft 5. However, in the aforementioned conventional technology, since the fluid force received by the brake piston 2 and the elastic force exerted by the compression spring 3 on the brake disc 1 have the same direction of force, when the fluid force received by the brake piston 2 is greater, the elastic force generated by the compression springs 3 will be smaller. This will affect the braking effect provided by the brake disc 1 on the rotating shaft 5, and it is difficult to apply to heavy cutting and high feed occasions.

SUMMARY OF THE INVENTION

The present invention has been accomplished under the circumstances in view. It is the main object of the present invention to provide a normally closed disc clamp system, which can achieve the effect of double pressurization and normally closed braking to improve the safety of operation, and is suitable for heavy cutting and high feed occasions.

To achieve this and other objects of the present invention, the normally closed disc clamp system of the present invention comprises a housing, a disc assembly, a brake ring, a pressure-enhancing ring, and an elastic unit. The housing has a receiving groove. The disc assembly is set in the receiving groove of the housing, comprising a first fixed disc, a second fixed disc and a rotating disc disposed between the first fixed disc and the second fixed disc. The brake ring is movably arranged in the receiving groove of the housing and forms a first chamber with the housing. In addition, the brake ring has a brake portion. When the brake ring is at a braking position, the brake portion of the brake ring presses against the first fixed disc, so that the rotating disc is fixed between the first fixed disc and the second fixed disc. When the brake ring is in a brake releasing position, the brake portion of the brake ring loosens the first fixed disc so that the rotating disc is rotatable relative to the first fixed disc and the second fixed disc. The pressure-enhancing ring is set in the receiving groove of the housing and partially abuts the brake ring, so that a second chamber is formed between the pressure-enhancing ring and the brake ring. The elastic unit is installed on the pressure-enhancing ring to provide elastic force to push the pressure-enhancing ring toward the brake ring.

It can be seen from the above that when a fluid is only supplied to the first chamber, the brake ring is kept in the brake releasing position by the action of the fluid. When the fluid is only supplied to the second chamber, the brake ring is held in the braking position by the fluid, and the pressure-enhancing ring compresses said elastic unit by the action of the fluid. The direction of the force applied by the fluid to the pressure-enhancing ring is opposite to the direction of the force applied by the elastic unit to the pressure-enhancing ring. According to Pascal's principle, since the second chamber is in a closed state, the energy generated by the compression of the elastic unit will act on the brake ring via the fluid, so that the brake ring achieves the effect of double pressurization. In addition, when the fluid is not supplied to the first chamber and the second chamber, the pressure-enhancing ring pushes the brake ring by the force exerted by the elastic unit, so that the brake ring is kept at the braking position to achieve a normally closed braking effect. In other words, the normally closed disc clamp system of the present invention uses the design of the first chamber and the second chamber to match the brake ring and the pressure-enhancing ring. As long as the fluid is supplied to the first chamber and the second chamber respectively, the brake ring can be controlled to provide the braking effect and brake releasing effect to the rotating disc. In addition, under the condition that the first chamber and the second chamber are not supplied with the fluid or fail, the brake ring can still be maintained at the braking position by the partial braking force provided by the elastic unit to achieve the effect of normally closed braking, thereby improving operational safety.

Preferably, the brake ring has an inner ring surface. The inner ring surface is embedded with a sealing ring and a backup ring adjacent to the sealing ring. The pressure-enhancing ring has a first flange and a second flange adjacent to the first flange on one side thereof towards the brake ring. The first flange of the pressure-enhancing ring abuts the brake ring. The second flange of the pressure-enhancing ring abuts the sealing ring and the backup ring. By this way, the sealing ring increases the sealing effect between the brake ring and the pressure-enhancing ring, and the backup ring keeps the brake ring in a good balance during operation, so as to prevent the brake ring from skew and affect the braking effect.

Preferably, the brake portion of the brake ring has a brake surface. When the brake ring is located at the braking position, the brake ring presses the first fixed disc with the brake surface of the brake portion. The radial length of the brake surface does not exceed the area where the first fixed disc, the second fixed disc, and the rotating disc overlap each other, so as to avoid the brake ring being pressed to the rotating disc or to a spacer ring set between the first fixed disc and the second fixed disc.

Preferably, the brake ring further has an inner ring surface adjacent to the brake surface. There is a first included angle between the brake surface and the inner ring surface. The first included angle is less than 90 degrees, so that the first fixed disc can be restored to its original state in the brake releasing state and prolong its service life.

Preferably, the first fixed disc has a compression section. When the brake ring is at the braking position, there is a second included angle between the compression section of the first fixed disc and the inner ring surface of the brake ring. The second included angle is less than or equal to the first included angle, so that the best clamping effect can be obtained.

Preferably, the elastic unit comprises a seat and a plurality of elastic members. The seat is arranged in the receiving groove of the housing and adjacent to the pressure-enhancing ring. The elastic members are arranged between the pressure-enhancing ring and the seat to push the pressure-enhancing ring toward the brake ring.

In addition, the present invention further provides a rotary table using the aforementioned normally closed disc clamp system, which further comprises a rotating shaft. The rotating shaft passes through the receiving groove of the housing in a rotatable manner and is fixed to the rotating disc with its outer peripheral surface. Thereby, when the brake ring is located at the braking position, the rotating disc is clamped and fixed between the first fixed disc and the second fixed disc, so that a braking effect is produced on the rotating shaft. When the brake ring is located at the brake releasing position, the rotating disc can be operated synchronously with the rotating shaft.

The detailed structure, features, assembly or use of the normally closed disc clamp system and the rotary table using the normally closed disc clamp system provided by the present invention will be described in the detailed description of the subsequent preferred embodiment. However, those with ordinary knowledge in the field of the present invention should be able to understand that the detailed description and specific embodiment listed in the implementation of the present invention are only used to illustrate the present invention, and are not intended to limit the scope of the patent application of the present invention.

DETAILED DESCRIPTION OF THE INVENTION

Figure 1:
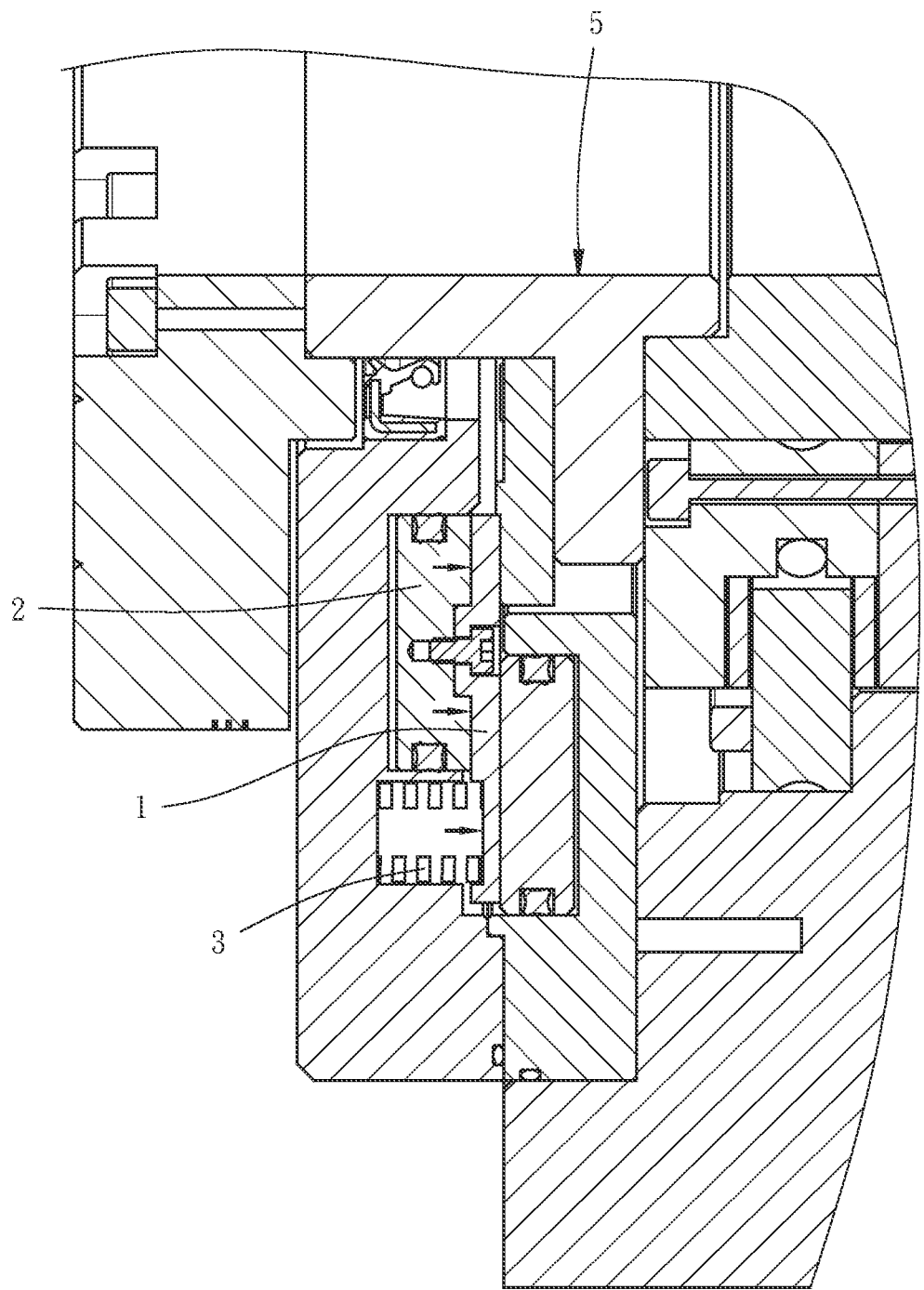
FIG. 1 is a partial cross-sectional view of a conventional normally closed brake, which mainly shows that the brake disc provides a braking effect on the rotating shaft.
Figure 2:
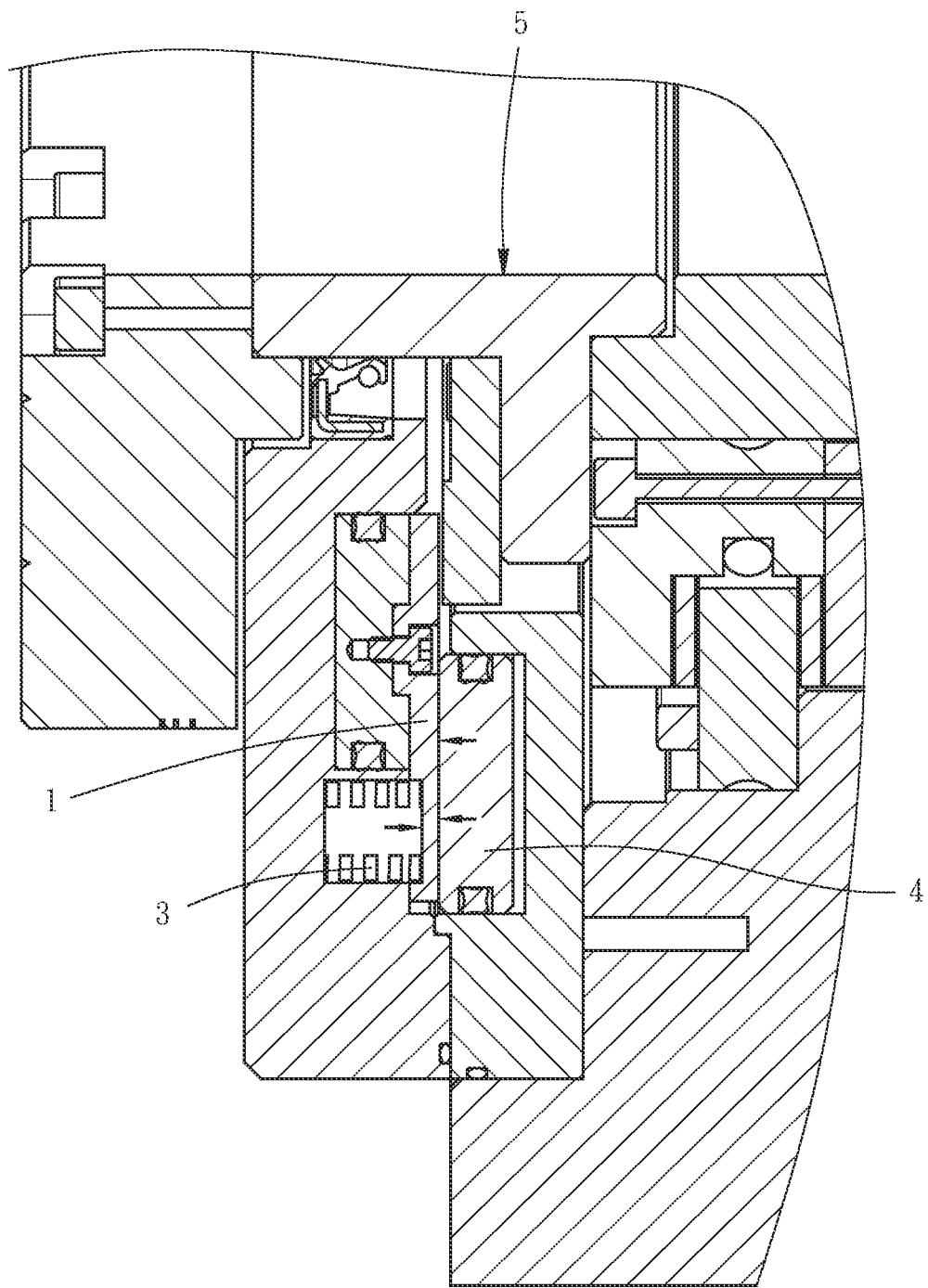
FIG. 2 is another partial cross-sectional view of the conventional normally closed brake, which mainly shows that the brake disc releases the braking effect on the rotating shaft.

The applicant first declares here, in the entire specification, including the embodiment described below and the claims of the patent application, the nouns relating to directionality are based on the directions in the drawings. Secondly, in the embodiment and drawings which will be described below, the same reference numerals are given to the same or similar elements or structural features thereof.

Figure 3:
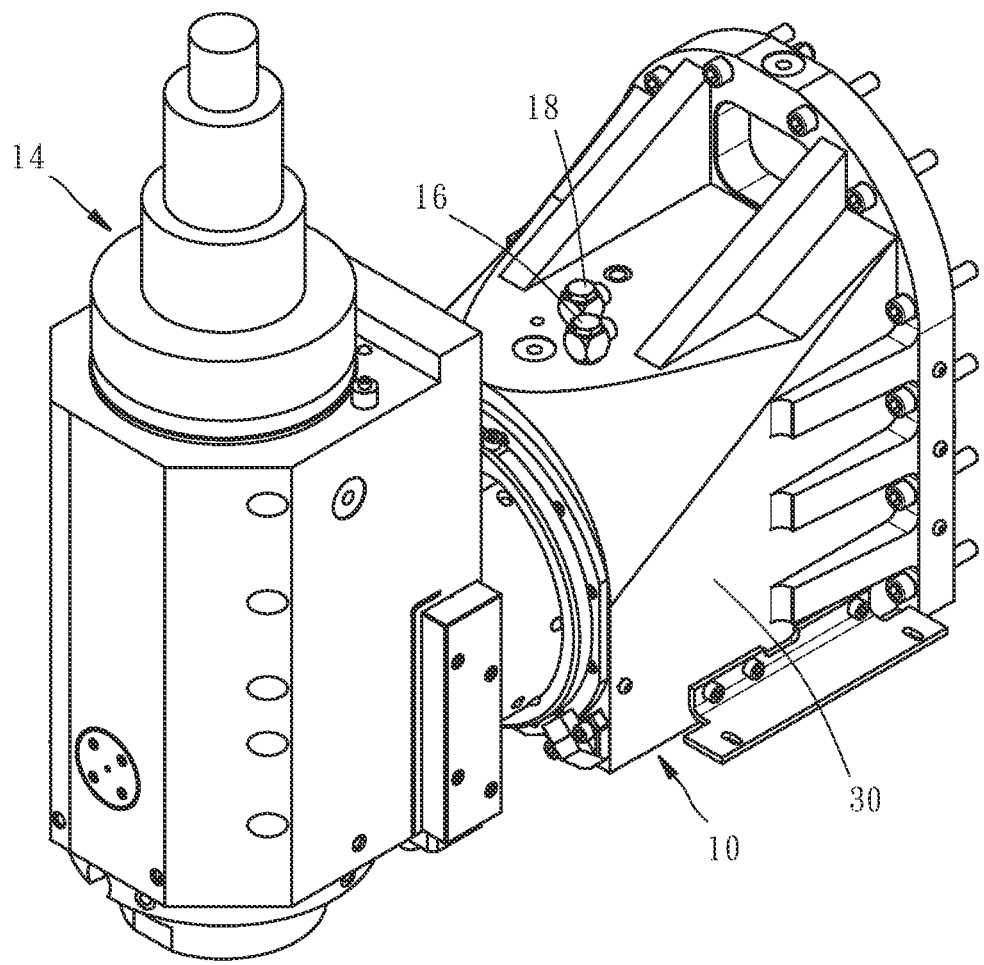
FIG. 3 is an oblique top elevational view of a rotary table used in conjunction with a swing spindle head in accordance with the present invention.
Figure 4:
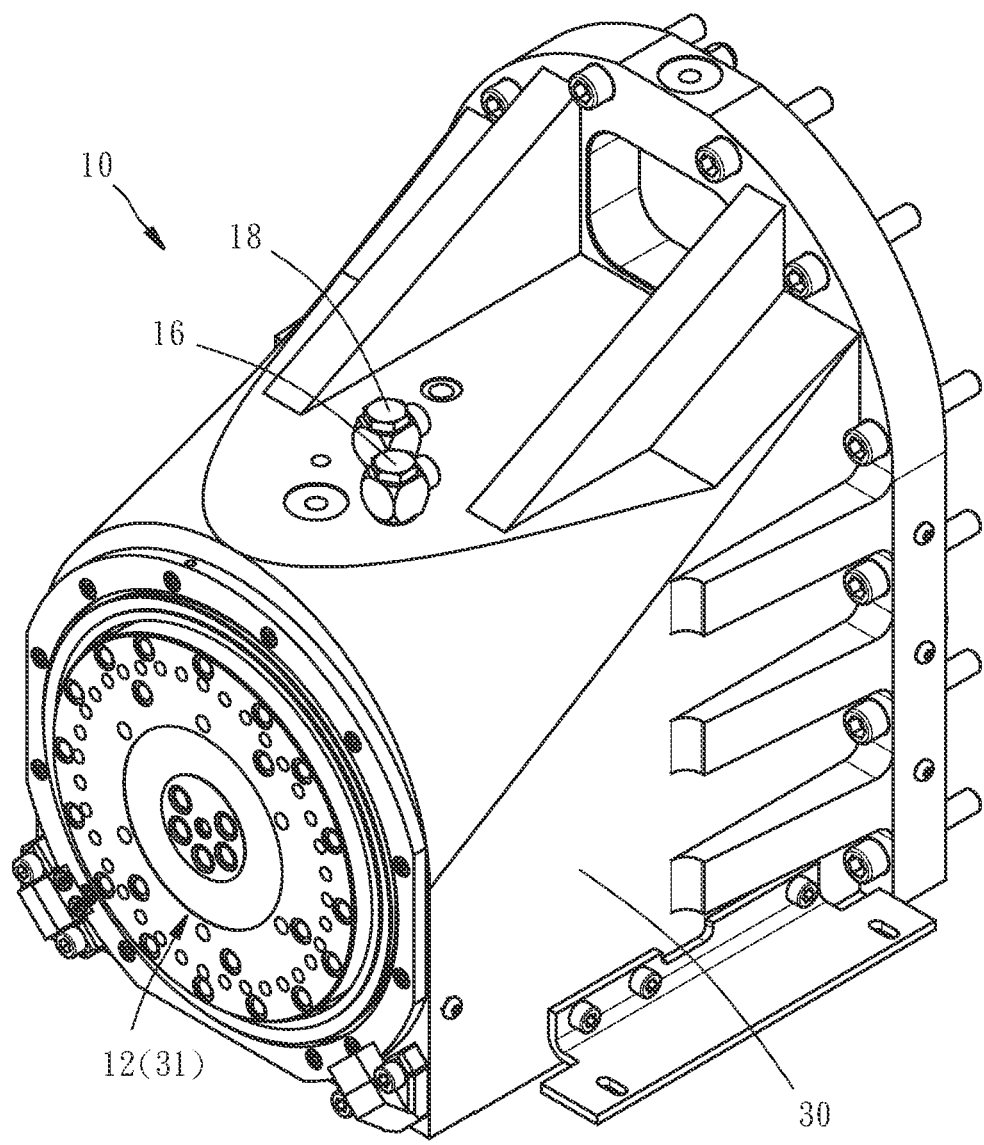
FIG. 4 is an oblique top elevational view of the rotary table of the present invention.
Figure 5:
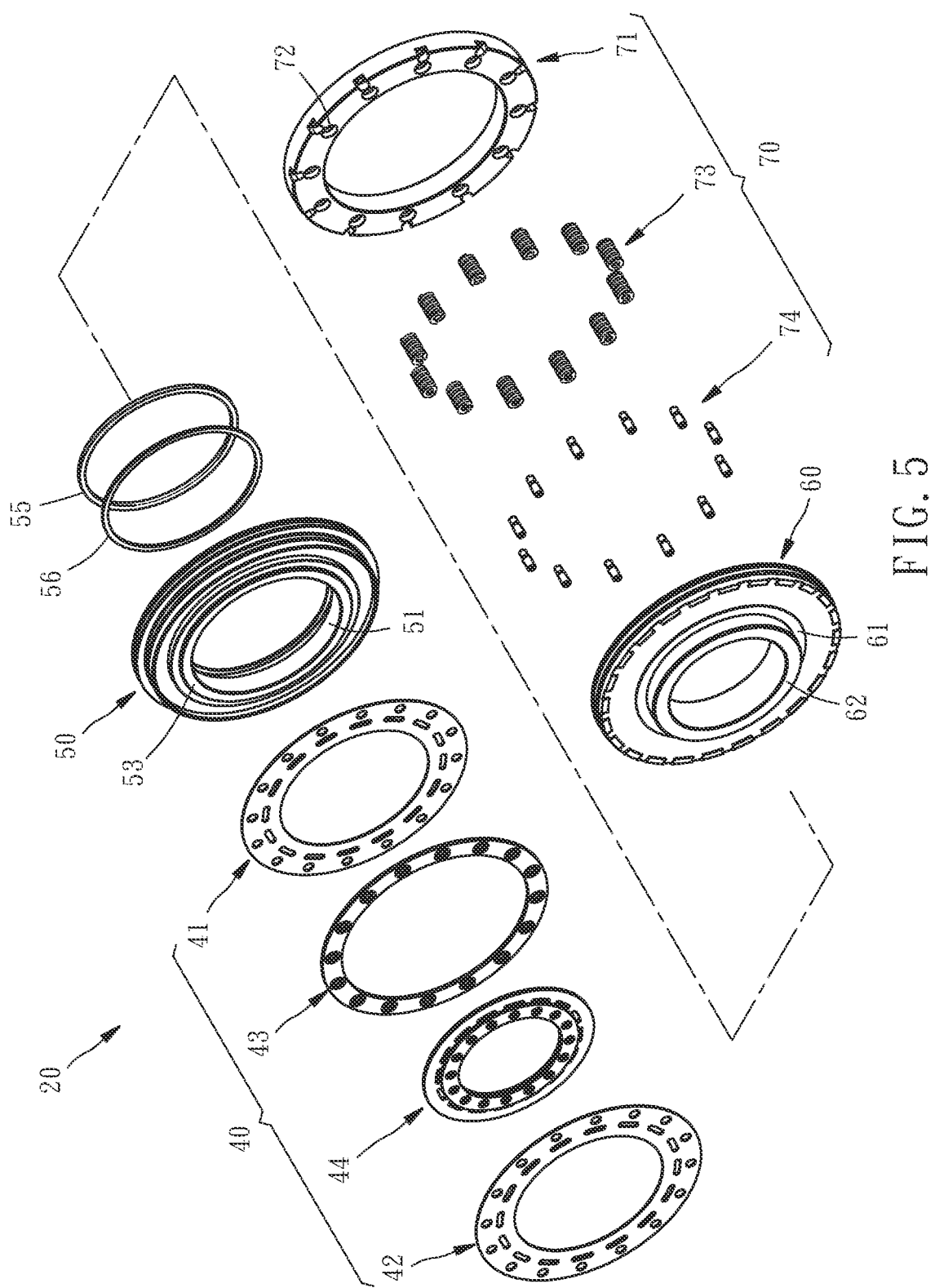
FIG. 5 is an exploded view of the normally closed disc clamp system provided by the rotary table of the present invention, where the housing is not drawn.
Figure 6:
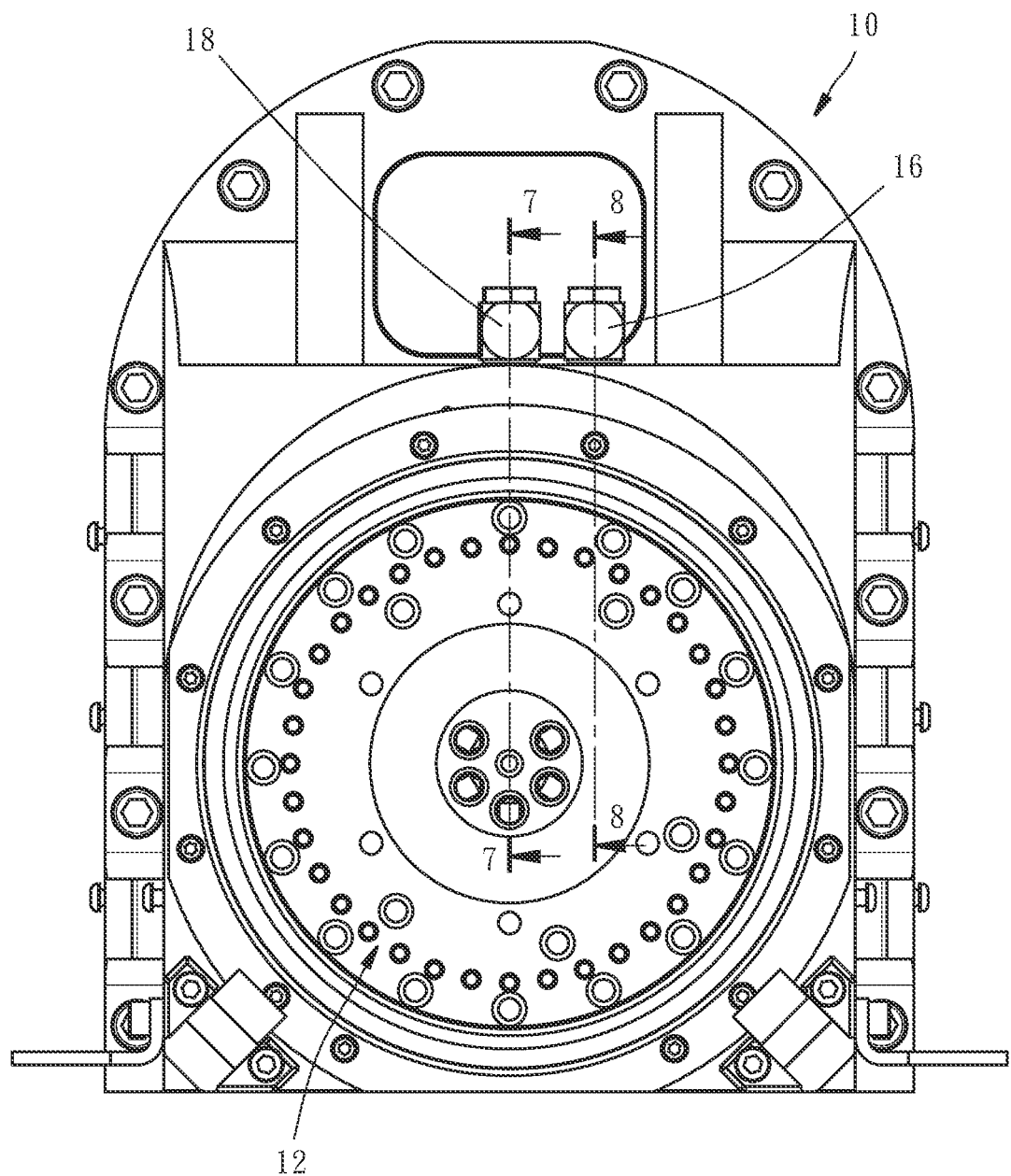
FIG. 6 is an end view of the rotary table of the present invention.

Referring to FIGS. 3 and 4, the normally closed disc clamp system 20 of the present invention is used in conjunction with a rotating shaft 12 to form a rotary table 10 with the rotating shaft 12. The rotating shaft 12 can be assembled with a swing spindle head 14, so that the swing spindle head 14 can be driven by the rotating shaft 12 to perform a swing operation. As shown in FIGS. 4 and 5, the normally closed disc clamp system 20 of the present invention comprises a housing 30, a disc assembly 40, a brake ring 50, a pressure-enhancing ring 60, and an elastic unit 70.

Figure 7:
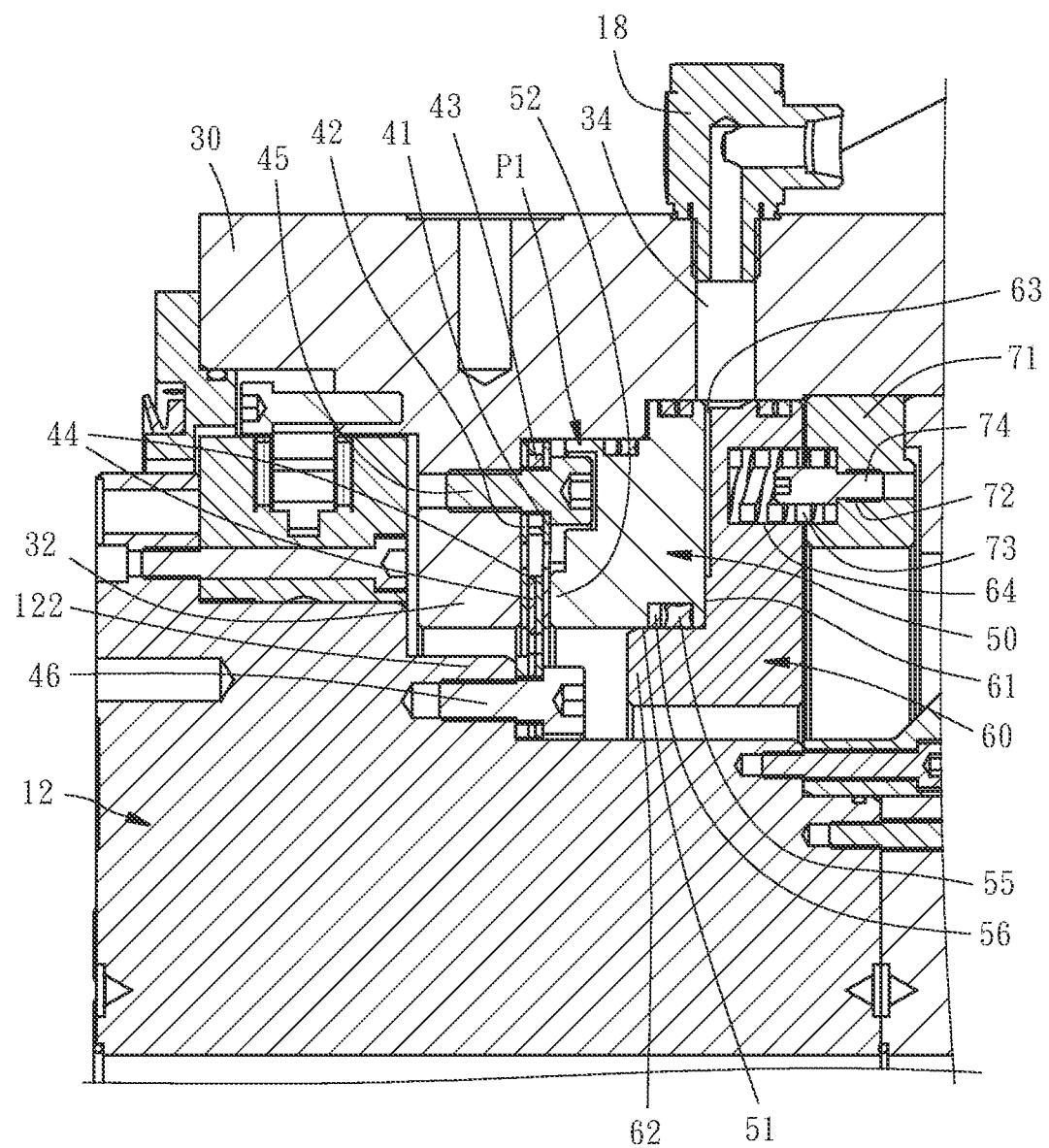
FIG. 7 is a partial cross-sectional view of FIG. 6 along the line 7-7, which mainly shows that no second fluid is passed into the second chamber.
Figure 8:
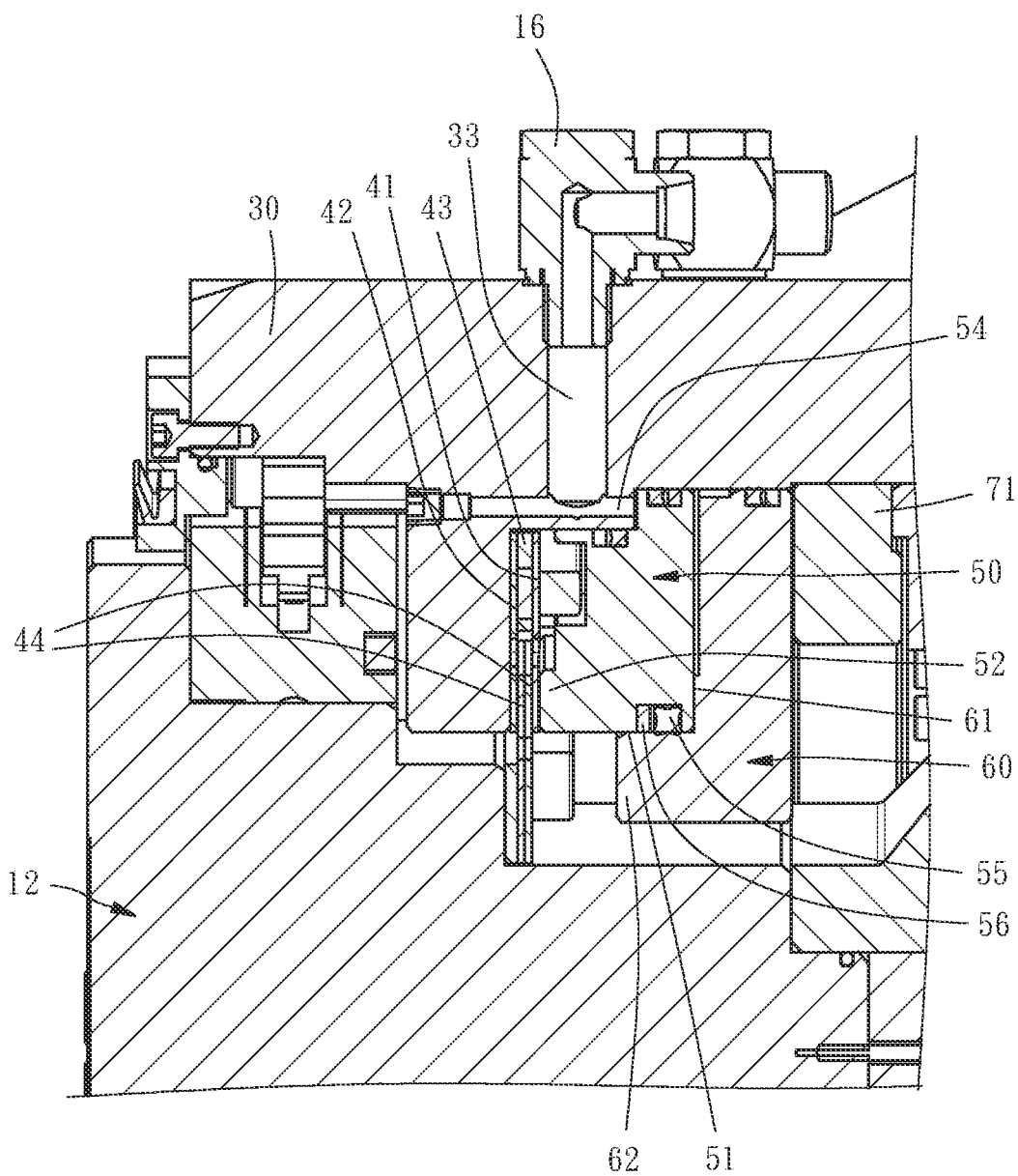
FIG. 8 is a partial cross-sectional view of FIG. 6 along the line 8-8, which mainly shows that the first fluid is not passed into the first chamber.

The housing 30 has a receiving groove 31 and an inner flange 32. The cross-sectional shape of the receiving groove 31 is circular, and the inner flange 32 protrudes radially from the groove wall of the receiving groove 31. As shown in FIGS. 4 and 7, the aforementioned rotating shaft 12 is rotatably installed in the receiving groove 31 and surrounded by the inner flange 32. In addition, the housing 30 further has a first flow channel 33 radially connected to the receiving groove 31 (as shown in FIG. 8) and a second flow channel 34 radially connected to the receiving groove 31 (as shown in FIG. 7). The inlet end of the first flow channel 33 is equipped with a first connector 16 for injecting a first fluid 22 (here, hydraulic oil, in fact, gas can also be used, not limited to hydraulic oil). The inlet end of the second flow channel 34 is equipped with a second connector 18 for injecting a second fluid 24 (here, hydraulic oil, in fact, gas can also be used, and it is not limited to hydraulic oil).

The disc assembly 40 is arranged in the receiving groove 31 of the housing 30 and comprises a first fixed disc 41, a second fixed disc 42, a spacer ring 43 and two rotating discs 44 stacked on each other. As shown in FIGS. 5 and 7, the first fixed disc 41, the second fixed disc 42 and the spacer ring 43 are fixed to the inner flange 32 of the housing 30 by a plurality of screws 45, wherein the second fixed disc 42 is closer to the inner flange 32 of the housing 30 than the first fixed disc 41, and the spacer ring 43 is located between the first fixed disc 41 and the second fixed disc 42 to separate the two. As shown in FIG. 7, the outer periphery of the two rotating discs 44 is located between the first fixed disc 41 and the second fixed disc 42, and the inner periphery of the two rotating discs 44 is fixed to an outer flange 122 of the rotating shaft 12 with a plurality of screws 46, so that two rotating discs 44 can be rotated with the rotating shaft 12.

Figure 9:
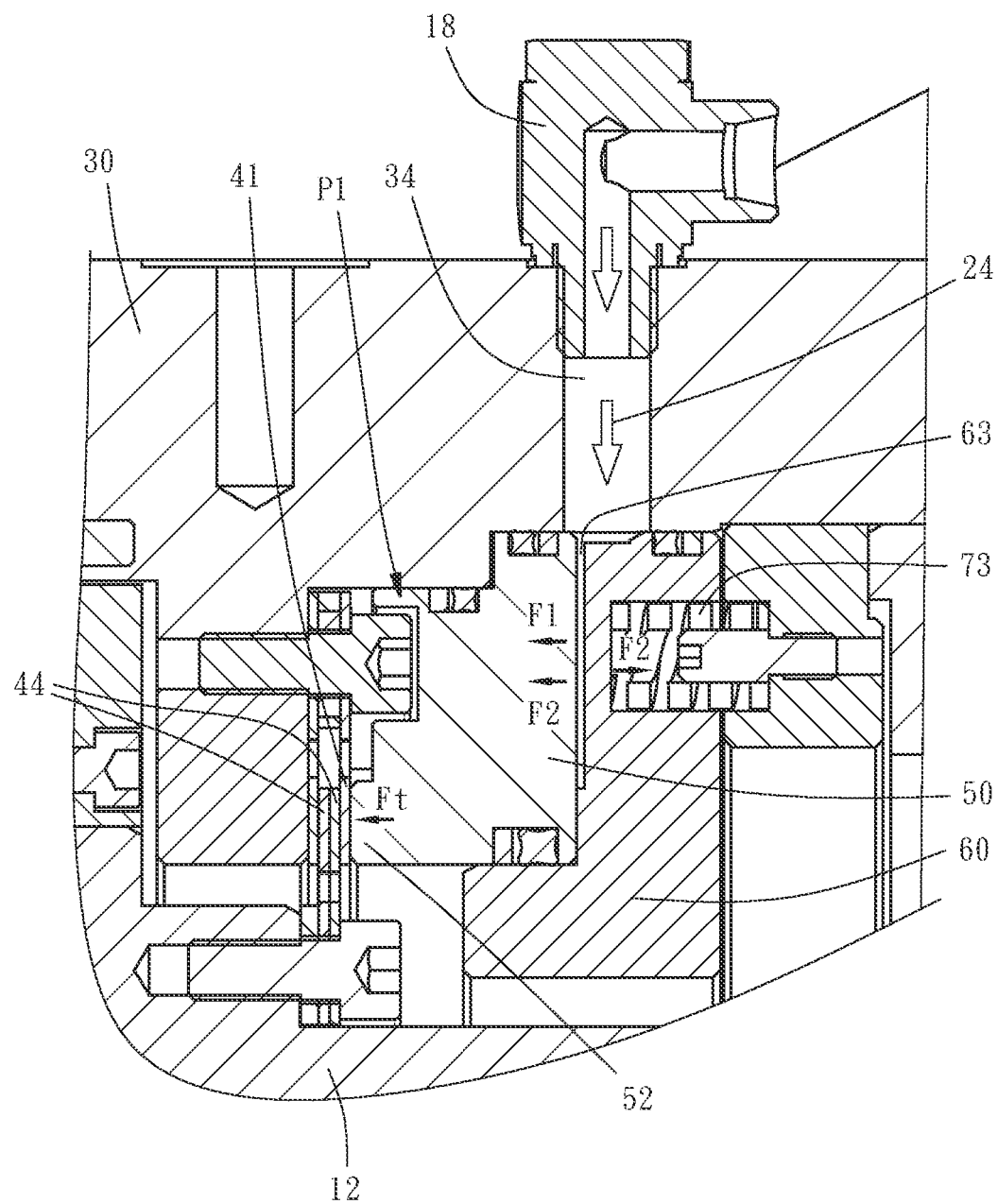
FIG. 9 is similar to FIG. 7, mainly showing the second fluid passed to the second chamber.
Figure 10:
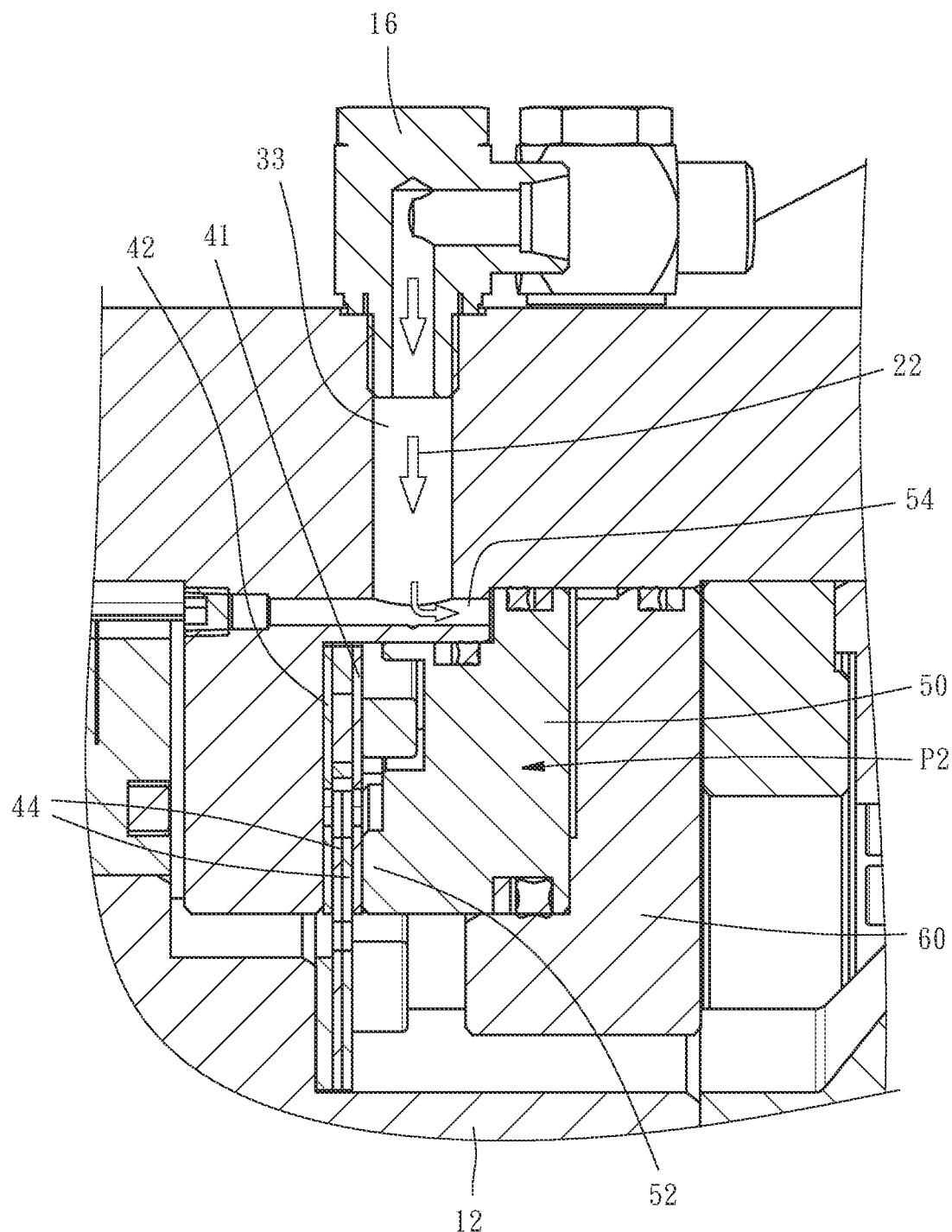
FIG. 10 is similar to FIG. 8, mainly showing the first fluid passed to the first chamber.

The brake ring 50 is arranged in the receiving groove 31 of the housing 30 in a manner that can be moved forwards and backwards. A first chamber 54 connected to the first flow channel 33 is formed between the brake ring 50 and the housing 30 (as shown in FIG. 8). The front and back ends of the first chamber 54 are enclosed by the housing 30 and the brake ring 50 respectively. The brake ring 50 is adjacent to the disc assembly 40, and has a brake portion 52 protruding from one side thereof towards the disc assembly 40. When the brake ring 50 is located at a braking position P1 as shown in FIG. 9, the brake ring 50 presses the first fixed disc 41 with the brake portion 52, so that the first fixed disc 41 is elastically deformed and the rotating discs 44 are clamped between the first fixed disc 41 and the second fixed disc 42. When the brake ring 50 is at a brake releasing position P2 as shown in FIG. 10, the brake portion 52 of the brake ring 50 loosens the first fixed disc 41 to restore the first fixed disc 41 to its original state. At this time, the rotating discs 44 can follow the rotating shaft 12 to rotate relative to the first fixed disc 41 and the second fixed disc 42.

The pressure-enhancing ring 60 is installed in the receiving groove 31 of the housing 30 and adjacent to the brake ring 50. The pressure-enhancing ring 60 has a first flange 61 and a second flange 62 adjacent to the first flange 61 protruding one side thereof toward the brake ring 50. As shown in FIG. 7, the pressure-enhancing ring 60 abuts against the brake ring 50 with the first flange 61, so that a second chamber 63 is formed between the pressure-enhancing ring 60 and the brake ring 50. The outer side of the second chamber 63 is connected to the second flow channel 34, and the inner side of the second chamber 63 is closed by the first flange 61. As shown in FIG. 7, the pressure-enhancing ring 60 abuts against an inner ring surface 51 of the brake ring 50 with the second flange 62. The inner ring surface 51 of the brake ring 50 is embedded with a sealing ring 55 and a backup ring 56 adjacent to the sealing ring 55. On the one hand, the sealing ring 55 increases the sealing effect between the two, and on the other hand, the backup ring 56 keeps the brake ring 50 in a good balance when it is in motion, so as to avoid the brake ring 50 from skew and affect the braking effect.

The elastic unit 70 is arranged in the receiving groove 31 of the housing 30 and comprises a seat 71, a plurality of elastic members 73 (here, compression springs are taken as an example), and a plurality of pins 74. The seat 71 is fixed in housing 30 and adjacent to the pressure-enhancing ring 60. The pressure-enhancing ring 60 has a plurality of recessed holes 64 at one side thereof facing the seat 71 (as shown in FIG. 7), and the seat 71 has a plurality of countersunk screw holes 72 (as shown in FIGS. 5 and 7) at one side thereof facing the pressure-enhancing ring 60. The elastic members 73 are arranged between the recessed holes 64 and the countersunk screw holes 72 in a one-to-one manner. One end of each of the elastic members 73 abuts against the seat 71 as a support, and the other end of each of the elastic members 73 abuts against the pressure-enhancing ring 60 to provide elastic force to constantly push the pressure-enhancing ring 60 toward the brake ring 50. The pins 74 are threaded through the elastic members 73 and screwed on the countersunk screw holes 72 in a one-to-one manner to provide support for the elastic members 73.

In actual operation, use the second connector 18 to inject the second fluid 24 into the second flow channel 34, so that the second fluid 24 enters the second chamber 63, as shown in FIG. 9. On the one hand, the second fluid 24 will push the brake ring 50 and keep the brake ring 50 at the braking position P1 as shown in FIG. 9. On the other hand, the second fluid 24 will push the pressure-enhancing ring 60 and make the pressure-enhancing ring 60 compress the elastic members 73. Since the second chamber 63 is in a closed state, and the force applied by the second fluid 24 to the pressure-enhancing ring 60 has the opposite direction to the force applied by the elastic members 73 to the pressure-enhancing ring 60, according to Pascal's principle, the energy generated by the compression of the elastic members 73 will act on the brake ring 50 through the second fluid 24, so that the brake ring 50 can achieve a double pressurization effect. That is, when the second fluid 24 is passed into the second chamber 63, Ft=F1+F2, where Ft is the total braking force provided by the brake ring 50, F1 is the thrust exerted by the second fluid 24 on the brake ring 50, and F2 is the energy produced when all elastic members 73 are compressed. If the second fluid 24 exerts a greater force on the pressure-enhancing ring 60, the energy generated by the compression of the elastic members 73 will also be greater, so the total braking force that the brake ring 50 can provide will also be greater.

Conversely, if you want the rotating shaft 12 to operate normally, first stop passing the second fluid 24 to the second chamber 63, and then use the first connector 16 to inject the first fluid 22 into the first flow channel 33, so that the first fluid 22 enters the first chamber 54, as shown in FIG. 10. The first fluid 22 will push the brake ring 50, then the brake ring 50 will push the pressure-enhancing ring 60. Since the elastic members 73 still exert a force on the pressure-enhancing ring 60 at this time, when the force applied by the first fluid 22 to the brake ring 50 is greater than the force applied by the elastic members 73 to the pressure-enhancing ring 60, the brake ring 50 can be maintained at the brake releasing position P2 as shown in FIG. 10. At this time, the rotating discs 44 will not be clamped by the first fixed disc 41 and the second fixed disc 42, so the rotating shaft 12 can be operated normally.

Once the supply of second fluid 24 fails due to special conditions (such as unannounced power outages or pipeline ruptures), although the brake ring 50 will lose the thrust provided by the second fluid 24, the elastic members 73 can still apply force to the brake ring 50 through the pressure-enhancing ring 60 to keep the brake ring 50 at the braking position P1 as shown in FIG. 7, so that the rotating shaft 12 achieves a safe shutdown effect.

In other words, under normal circumstances, the brake ring 50 will use the force of the second fluid 24 and the force generated when the elastic members 73 are compressed to provide a complete braking force to the rotating discs 44. If the supply of the second fluid 24 fails, part of the braking force provided by the elastic members 73 can still maintain the brake ring 50 at the braking position P1 as shown in FIG. 7, thereby achieving the effect of normally closed braking and improving the safety of operation.

Figure 11:
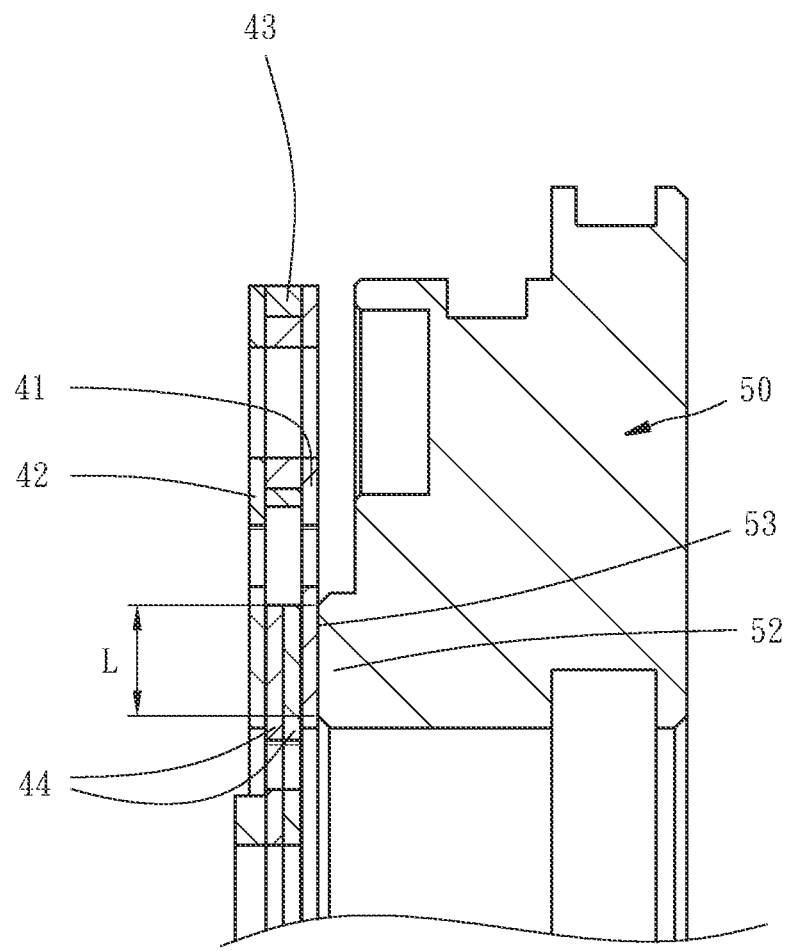
FIG. 11 is a partial cross-sectional view of the normally closed disc clamp system of the present invention, which mainly shows the structural relationship between the brake ring and the disc assembly.

Another thing that needs to be added is that, as shown in FIG. 11, the brake portion 52 of the brake ring 50 has a brake surface 53 for pressing against the first fixed disc 41. The radial length L of the brake surface 53 does not exceed the overlapping area of the first fixed disc 41, the second fixed disc 42, and the rotating discs 44. If the radial length L of the brake surface 53 exceeds the aforementioned range, in addition to pressing the rotating discs 44 and causing damage to the rotating discs 44, it may also press the spacer ring 43 and affect the braking effect.

Figure 12:
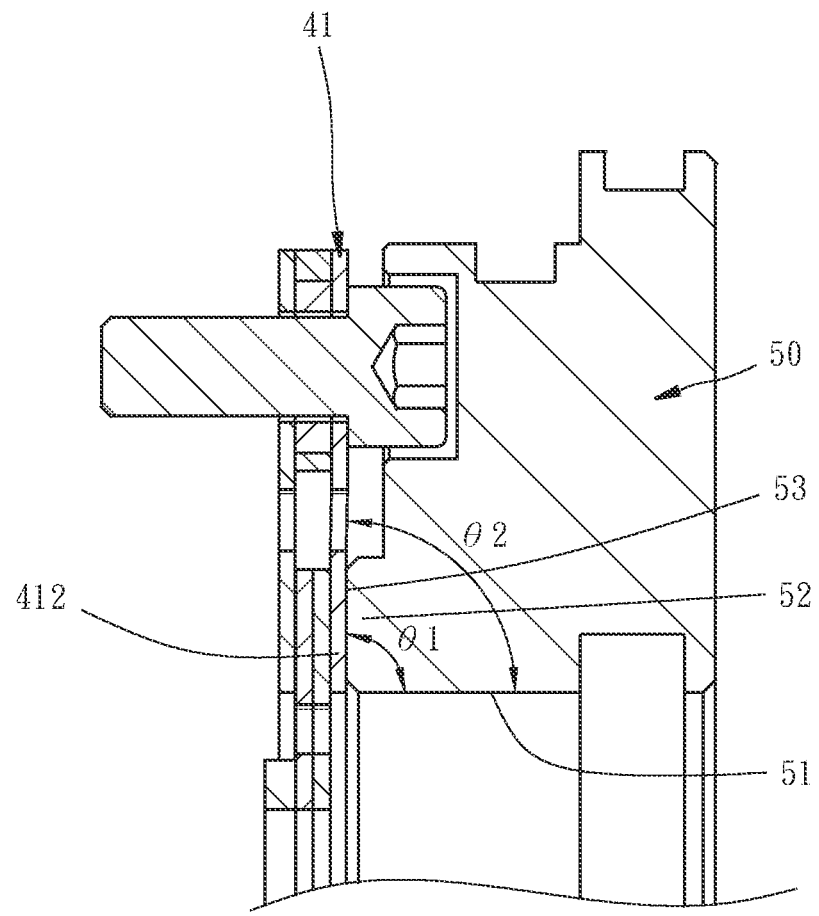
FIG. 12 is another partial cross-sectional view of the normally closed disc clamp system of the present invention, which mainly shows the angular relationship between the brake ring and the disc assembly.

As shown in FIG. 12, the brake surface 53 is adjacent to the inner ring surface 51 and a first included angle θ1 is defined between the brake surface 53 and the inner ring surface 51 that is less than 90 degrees. If the first included angle θ1 is greater than or equal to 90 degrees, it may cause the first fixed disc 41 to be pressed down by the brake surface 53 and deform into a state similar to S, so that the first fixed disc 41 has two bending points. This state belongs to the shearing effect, making it difficult to restore the original state, so it is easy to affect the operation of the rotating discs 44 in the brake releasing state. If the first included angle θ1 is less than 90 degrees, the first included angle θ1 is close to the deformation angle of the first fixed disc 41, so that the first fixed disc 41 has only one bending point, which can effectively improve the impact of the shear force on the life of the first fixed disc 41. In addition, the first fixed disc 41 has a compression section 412 that is pressed by the brake surface 53. There is a second included angle θ2 between the compression section 412 of the first fixed disc 41 and the inner ring surface 51 of the brake ring 50. The second included angle θ2 is less than or equal to the first included angle θ1. With the aforementioned special angle design, on the one hand, the best clamping effect can be obtained, and on the other hand, the first fixed disc 41 can be restored to its original state smoothly when the brake is released, so as to extend the service life of the first fixed disc 41.

In summary, the normally closed disc clamp system 20 of the present invention uses the design of the first chamber 54 and the second chamber 63 with the brake ring 50 and the pressure-enhancing ring 60, as long as the first fluid 22 and the second fluid 24 are injected into the first chamber 54 and the second chamber 63 respectively, the brake ring 50 can be controlled to provide the braking effect and the brake releasing effect on the rotating discs 44. In addition, when the first fluid 22 is not injected into the first chamber 54 and the second fluid 24 is not injected into the second chamber 63 (or the supply of the second fluid 24 fails), with part of the braking force provided by the elastic members 73, the brake ring 50 can still be maintained at the braking position P1 to achieve the effect of normally closed braking, thereby improving the safety of operation, so it is suitable for heavy cutting and high feed occasions.

What is claimed is:

1. A normally closed disc clamp system, comprising:
a housing comprising a receiving groove;
a disc assembly arranged in said receiving groove of said housing, said disc assembly comprising a first fixed disc, a second fixed disc and a rotating disc, said rotating disc being set between said first fixed disc and said second fixed disc;
a brake ring movably installed in said receiving groove of said housing and forming a first chamber with said housing, said brake ring comprising a brake portion pressing against said first fixed disc when said brake ring is located at a braking position, so that said rotating disc is fixed between said first fixed disc and said second fixed disc, and releasing said first fixed disc when said brake ring is located at a brake releasing position, so that said rotating disc is rotatable relative to said first fixed disc and said second fixed disc;
a pressure-enhancing ring provided in said receiving groove of said housing and partially abutting said brake ring, so that a second chamber is formed between said pressure-enhancing ring and said brake ring; and
an elastic unit installed in said pressure-enhancing ring to push said pressure-enhancing ring in the direction of said brake ring;
wherein when a fluid is only supplied to the first chamber, said brake ring is kept in said brake releasing position by the action of said fluid; when said fluid is only supplied to said second chamber, said brake ring is held in said braking position by said fluid, and said pressure-enhancing ring compresses said elastic unit by the action of said fluid; the direction of the force applied by said fluid to said pressure-enhancing ring is opposite to the direction of the force applied by said elastic unit to said pressure-enhancing ring; when said fluid is stopped from entering said first chamber and said second chamber, said pressure-enhancing ring pushes said brake ring by the force exerted by said elastic unit, so that said brake ring is kept in said braking position, wherein said brake portion of said brake ring comprises a brake surface, said brake ring pressing said first fixed disc with said brake surface of said brake portion when said brake ring is located at said braking position, said brake ring further comprising an inner ring surface adjacent to said brake surface, said brake surface and said inner ring surface defining therebetween a first included angle, said first included angle being less than 90 degrees.

2. The normally closed disc clamp system as claimed in claim 1, wherein said inner ring surface embedded with a sealing ring and a backup ring adjacent to said sealing ring; said pressure-enhancing ring comprises a first flange and a second flange adjacent to said first flange on a side thereof towards said brake ring, said first flange abutting said brake ring, said second flange abutting said sealing ring and said backup ring.

3. The normally closed disc clamp system as claimed in claim 1, wherein the radial length of said brake surface being within the overlapping area of said first fixed disc, said second fixed disc, and said rotating disc.

4. The normally closed disc clamp system as claimed in claim 1, wherein said first fixed disc comprises a compression section, said compression section of said first fixed disc defining with said inner ring surface of said brake ring a second included angle therebetween, said second included angle being less than or equal to said first included angle; said brake ring presses said compression section of said first fixed disc with said brake surface of said brake portion when said brake ring is located at said braking position.

5. The normally closed disc clamp system as claimed in claim 1, wherein said elastic unit comprises a seat and a plurality of elastic members, said seat being arranged in said receiving groove of said housing and adjacent to said pressure-enhancing ring, said elastic members being arranged between said pressure-enhancing ring and said seat to push said pressure-enhancing ring toward said brake ring.

6. A rotary table, comprising:
a normally closed disc clamp system as claimed in claim 1; and
a rotating shaft rotatably arranged in said receiving groove of said housing, said rotating shaft having an outer peripheral surface thereof fixed to said rotating disc, so that said rotating shaft is operable synchronously with said rotating disc.

7. The rotary table as claimed in claim 6, wherein said inner ring surface embedded with a sealing ring and a backup ring adjacent to said sealing ring; said pressure-enhancing ring comprises a first flange and a second flange adjacent to said first flange on a side thereof towards said brake ring, said first flange abutting said brake ring, said second flange abutting said sealing ring and said backup ring.

8. The rotary table as claimed in claim 6, wherein the radial length of said brake surface being within the overlapping area of said first fixed disc, said second fixed disc, and said rotating disc.

9. The rotary table as claimed in claim 6, wherein said first fixed disc comprises a compression section, said compression section of said first fixed disc defining with said inner ring surface of said brake ring a second included angle therebetween, said second included angle being less than or equal to said first included angle; said brake ring presses said compression section of said first fixed disc with said brake surface of said brake portion when said brake ring is located at said braking position.

10. The rotary table as claimed in claim 6, wherein said elastic unit comprises a seat and a plurality of elastic members, said seat being arranged in said receiving groove of said housing and adjacent to said pressure-enhancing ring, said elastic members being arranged between said pressure-enhancing ring and said seat to push said pressure-enhancing ring toward said brake ring.

* * * * *